S. R. BRYAN.

RAILWAY RAIL STAY.

APPLICATION FILED OCT. 3, 1907.

12,862.

Reissued Oct. 13, 1908.

2 SHEETS—SHEET 1

Witnesses:
Robert A. Weir
L. V. Domarus Jr.

Inventor:
Simon R. Bryan
By O. R. Barnett
Attorney

S. R. BRYAN.

RAILWAY RAIL STAY.

APPLICATION FILED OCT. 3, 1907.

12,862. Reissued Oct. 13, 1908.

2 SHEETS—SHEET 2.

Witnesses:

Robert H. Weir

L. V. Domarus Jr.

Inventor:

Simon R. Bryan

By O. R. Barnett

Attorney

UNITED STATES PATENT OFFICE.

SIMON R. BRYAN, OF RACINE, WISCONSIN, ASSIGNOR, BY MESNE ASSIGNMENTS, TO OTTO R. BARNETT, OF CHICAGO, ILLINOIS.

RAILWAY-RAIL STAY.

No. 12,862. Specification of Reissued Letters Patent. Reissued Oct. 13, 1908.

Original No. 800,980, dated October 3, 1905. Serial No. 268,464. Application for reissue October 3, 1907. Serial No. 395,720½.

*To all whom it may concern:*

Be it known that I, SIMON R. BRYAN, of Racine, in the county of Racine, in the State of Wisconsin, have invented new and useful Improvements in Railway-Rail Stays, of which the following, taken in connection with the accompanying drawings, is a full, clear, and exact description.

This invention relates to the class of rail stays or anchors which are designed to prevent longitudinal creeping of the rails of railroads; and the invention consists in a novel construction and combination of its component parts which cause the rail-stay to automatically tighten its hold on the rail by the strain exerted in resisting the creeping of the rails; and the invention also embodies certain novel features of its details, as hereinafter described, and summed up in the claims.

Figure 1:
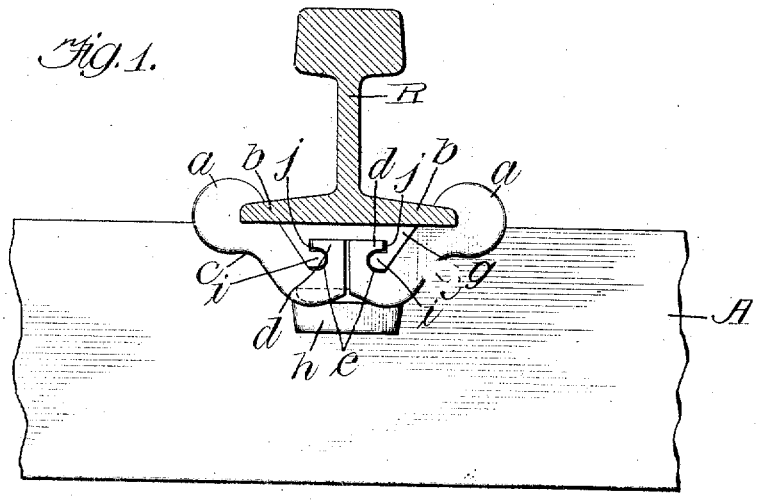
Figure 2:
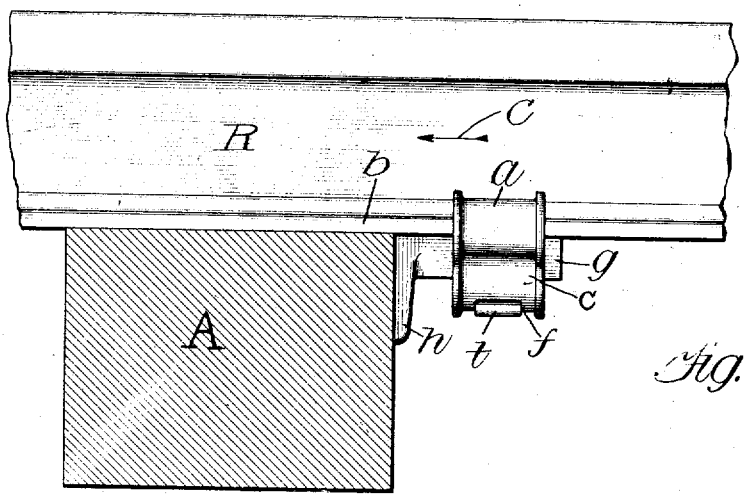
Figure 5:
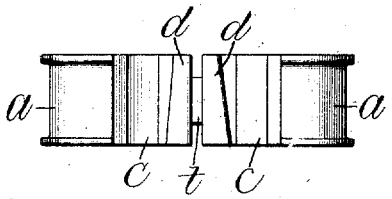
Figure 4:
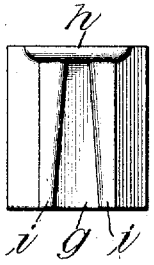
Figure 7:
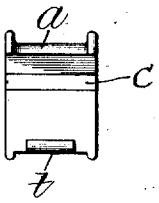
Figure 6:
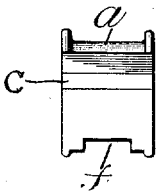
Figure 3:
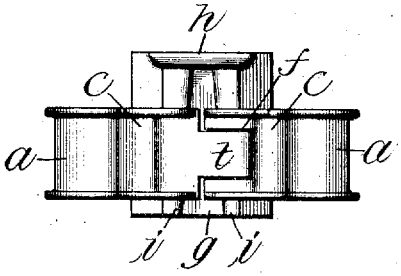

In the accompanying drawings, Figure 1 is a transverse section of a rail equipped with my invention. Fig. 2 is a side view of the same. Fig. 3 is an inverted plan view of my improved rail-stay. Fig. 4 is an inverted plan view of the arm which, in the specific embodiment of my invention shown in the drawings, serves to engage a relatively stationary abutment, such as a sleeper or tie, to enable the entire device to resist the creeping strain of the rail and also serves as a means for tightening the jaws upon the rail. Fig. 5 is a plan view of the rail-gripping jaws, and Figs. 6 and 7 are inverted inner end views of the said jaws.

Similar letters of reference indicate corresponding parts.

R denotes the railway-rail, and A the cross-tie, which supports said rail in the usual manner.

The arrow C in Fig. 2 indicates the direction in which the rail tends to creep.

*a a* are the rail-gripping members of the rail-stay, which members are preferably of the form of hooks or jaws, which are disposed to engage the flanges *b b* on opposite sides of the rail, and thus grip the rail between the jaws. Said jaws are formed with downwardly and inwardly inclined extensions *c c*, terminating in horizontal wedge flanges *d d*, which are beveled toward each other and are disposed lengthwise under the rail R and formed with longitudinal grooves *e* under the outer edges of the wedges, as shown in Fig. 1 of the drawings. The bottom of one of the extensions *c* is provided with a transverse groove *f*, and the bottom of the other of said extensions is formed with a tongue *t*, which passes through the groove *f* when the jaws are applied to the rail. Said tongue-and-groove connection serves to maintain the jaws in line with each other.

*g* represents a horizontal arm which is disposed lengthwise under the rail R and is rigidly sustained against the cross-tie A by means of a vertical plate *h*, formed on the end of the said arm and abutting against the side of the cross-tie. The said arm is provided with suitable means for compressing the two wedge flanges *d d*, and thus tightening the grip of the jaws *a a* on the rail R. I preferably form said arm with ribs or ways *i i*, which are inclined endwise toward each other, corresponding to the bevels of the two wedge flanges *d d*, and receive said wedges between them, as shown in Fig. 1 of the drawings, the inclination of the ways *i i* being illustrated in Fig. 4 of the drawings. The said ways are undercut longitudinally, as shown at *j*, to receive the adjacent wedges *d d*, and thus couple the arm *g* to the jaws *a a*.

In the operation of the described rail-stay the longitudinal strain exerted on the rail due to its tendency to creep longitudinally causes the wedge flanges *d d* of the jaws *a a* to be forced tightly toward the converging ends of the ways *i i*, and thus draw said wedges together, thereby drawing the jaws *a a* more tightly against the flanges of the rail. Hence my improved rail-stay is adjusted automatically to securely grip the rail, and thus its efficiency is materially increased and it is rendered safe and reliable.

It will be observed that in its essential features my invention comprises the jaws *a a* which directly grip the rail flanges, and means connecting the jaws, which means are provided with co-engaging, wedge-shaped shoulders extending longitudinally of the rail, whereby a relative movement of the connecting parts toward each other lengthwise of the rail will cause the jaws to be drawn toward each other and to more tightly grip the rail. In the embodiment of my invention shown in the drawings, the connecting parts comprise the extensions *c* and the horizontal arm *g*, but it is immaterial how many individual parts may be used to connect these jaws so long as some of the parts, be they few or many, which connect the jaws with each other are provided with these co-engaging shoulders whereby a relative movement of one or more of the connecting parts lengthwise of the rail will cause the wedge-shaped shoulders to coöperate to draw the rail gripping jaws more tightly together. The essence of this feature of my invention is the use of such co-engaging shoulders upon that part or those parts of the device which extend beneath the rail and connect the jaws to each other.

What I claim as my invention is:

1. A rail-stay consisting of jaws disposed to grip opposite sides of the rail, wedges sustained on said jaws, a stationary member adapted to abut against a cross tie, and means sustained on said stationary member and actuating the aforesaid wedges.

2. A rail-stay consisting of independently movable jaws disposed to grip the rail between them and said jaws formed with wedges beveled toward each other lengthwise of the rail, and an arm adapted to abut against a cross-tie and provided with means for engaging said wedges to automatically tighten the grip of the jaws by resistance of the creeping of the rail.

3. A rail-stay consisting of jaws disposed to grip the rail between them and formed with wedges beveled toward each other and disposed under the rail, and an arm adapted to abut against a cross-tie and formed with ways compressing the wedges between them to tighten the grip of the jaws on the rail.

4. A rail-stay consisting of jaws disposed to grip the rail between them and formed with downward extensions terminating in wedge-shaped flanges beveled toward each other, and an arm adapted to abut against a cross-tie and formed with ways receiving the wedges between them and inclined correspondingly as set forth.

5. A rail-stay consisting of jaws disposed to grip the rail between them and formed with downward extensions terminating in wedge-shaped flanges beveled toward each other lengthwise of the rail and grooved longitudinally under the wedges, and an arm disposed longitudinally under the rail adapted to abut against a cross-tie and provided with undercut ways receiving between them the aforesaid wedges substantially as set forth and shown.

6. A rail-stay consisting of rail-gripping jaws disposed at opposite sides of the rail and formed with downward extensions and with a transverse groove in one of said extensions and a tongue on the other extension passing through the said groove, and means for forcing the jaws into gripping position on the rail.

7. A rail-stay consisting of jaws disposed to grip the rail between them and formed with downward extensions, and with a transverse groove in one of said extensions, a tongue on the other of said extensions passing through said groove, and wedges on the lower ends of the extensions and beveled longitudinally toward each other, and an arm abutting against the side of the cross-tie and formed with ways receiving the wedges between them and inclined correspondingly substantially as set forth and shown.

8. A rail-stay comprising two jaws disposed to grip the rail between them, means connecting said jaws with each other, said means being provided with co-engaging surfaces of such contour that a relative movement between said connecting means in a direction lengthwise of the rail will draw said jaws toward each other, and means for holding said device so as to resist the creeping of the rail.

9. A rail-stay comprising two jaws disposed to grip the rail between them, means extending beneath the rail and connecting said jaws with each other, said means being provided with co-engaging faces of such contour that a relative movement between said connecting means in one direction lengthwise of the rail will cause said jaws to be drawn together to more tightly grip the rail, a part of the structure being provided with a shoulder adapted to engage an abutment whereby said device will resist a creeping tendency of the rail.

10. A rail-stay comprising two jaws disposed to grip a rail between them, means connecting said jaws with each other, said means being provided with co-engaging wedge-shaped shoulders extending in a direction lengthwise of the rail, said structure being provided with a shoulder adapted to engage a relatively stationary abutment whereby, when the device is assembled in position upon a rail, the relative movement of the parts resulting from the tendency of the rail to creep will cause said jaws to be drawn toward each other so as to more tightly grip the rail.

11. A rail-stay comprising a plurality of relatively movable parts, two of said parts being provided with rail-clamping jaws, a plurality of said parts being provided with co-engaging shoulders of such contour that a movement of two of said parts toward each other in a direction substantially transverse of the line of travel of said jaws toward each other will draw said jaws toward each other, and means for holding said rail-stay to resist the creeping of the rail to which it may be applied.

12. A rail stay comprising a plurality of connected and relatively movable parts, two of said parts being provided with rail clamping jaws and two of said parts being provided with co-engaging shoulders of such contour that a relative movement between them and toward each other in a direction substantially transverse to the line of travel of said jaws toward each other will draw said jaws toward each other, one of said last-mentioned parts being provided with a shoulder adapted to engage an abutment to resist creeping of the rail.

13. The combination with a pair of jaws adapted to grip a rail between them, of a plurality of relatively movable parts operatively connected with said jaws and provided with co-engaging surfaces of such contour that a relative movement between said movable parts toward each other and in a direction lengthwise of the rail to which the device is applied will result in a wedging action, whereby said jaws will be drawn toward each other.

14. A rail stay, comprising a plurality of connected parts extending under and around the lower portion of the rail, and rail clamping jaws on a plurality of the parts, the connected parts of said rail stay having slidable engagement with each other on lines oblique to the rail, a part of the structure being provided with an abutment to engage a tie so that a lengthwise movement of the rail towards said tie causes the jaws when clamped thereon, to approach each other.

15. The combination with a railway rail, of a plurality of connected but separately movable clamps extending beneath the rail and engaging the base thereof from opposite sides, a stationary abutment, and means whereby any movement of the rail towards said abutment acts to force the clamps into closer engagement with the rail.

16. A rail stay, comprising two jaws disposed to grip the rail between them, means connecting said jaws, said means being provided with co-engaging wedge surfaces of such contour that the relative sliding movement between said connecting means caused by the creeping of the rail will draw said jaws toward each other on lines at right angles to the length of the rail, and means for holding said device so as to resist the creeping of the rail.

17. A rail stay, comprising two jaws disposed to grip the rail between them, means connecting said jaws with each other, said means being provided with co-engaging wedge surfaces extending beneath and lengthwise of the rail and of such contour that the relative movement between said wedge surfaces caused by the creeping of the rail will draw said jaws toward each other transversely of the rail, and means for holding said device so as to resist the creeping of the rail.

18. The combination with a pair of jaws adapted to grip a rail between them, of a plurality of relatively movable parts operatively connected with said jaws and provided with co-engaging surfaces extending under and lengthwise of the rail, of such contour that the relative movement between said movable parts caused by the creeping of the rail will result in a wedging action, whereby said jaws will be caused to move toward each other on lines at right angles to the length of the rail.

19. A rail stay, comprising a plurality of connected and relatively movable parts, two of said parts being provided with rail clamping jaws and two of said parts being provided with interlocking, co-engaging shoulders of such contour that the relative sliding movement between said shoulders caused by the creeping of the rail will draw said jaws toward each other transversely of the rail, one of said parts being provided with a shoulder adapted to engage an abutment to resist creeping of the rail.

20. A rail stay, comprising a plurality of connected and relatively movable parts, two of said parts being provided with rail clamping jaws and two of said parts being provided with interlocking and co-engaging shoulders arranged beneath the rail and extending lengthwise of the rail, said shoulders being of such contour that the relative sliding movement between them caused by the creeping of the rail will draw said clamping jaws toward each other so as to more tightly grip the rail.

SIMON R. BRYAN.

Witnesses:
C. C. GITTINGS,
W. A. WALKER.